United States Patent [19]

Jankovic

[11] Patent Number: 4,671,489
[45] Date of Patent: Jun. 9, 1987

[54] WEDGE SLUICE VALVE

[76] Inventor: Mladen Jankovic, Chruzmattliring 10, CH-6403 Kussnacht, Switzerland

[21] Appl. No.: 719,977

[22] Filed: Apr. 4, 1985

[30] Foreign Application Priority Data

Apr. 10, 1984 [YU] Yugoslavia .......................... 654/84

[51] Int. Cl.$^4$ .............................................. F16K 3/00
[52] U.S. Cl. .................................... 251/327; 251/175; 251/195
[58] Field of Search ............... 251/167, 175, 193, 195, 251/196, 326, 327, 329; 137/596.15, 596.16, 119

[56] References Cited

U.S. PATENT DOCUMENTS 3,123,090 3/1964 Bredtschneider .................. 251/327
3,135,284 6/1964 Magos ................................ 251/327

Primary Examiner—Larry Jones
Assistant Examiner—Noah Kamen
Attorney, Agent, or Firm—Burns, Doane, Swecker & Mathis

[57] ABSTRACT

A wedge-shaped gate member, movable by a valve rod, is disposed in a housing and can be pressed against valve seats on two ends of aligned tubular conduit sections. Each interior space of the tubular conduit sections is connected to the housing interior space via a respective auxiliary valve device. These devices each work as check valves, whereby when the wedge sluice valve is closed a pressure is maintained in the housing interior space which is equal to the pressure in the tubular conduit section which is serving as the feed pipe. The pressure in the housing interior space presses the wedge-shaped gate member against its associated seats and ensures a reliable seal. The wedge angle of the wedge-shaped gate member is relatively large, and said member is slidably guided in the housing. In this way, the friction between and the wear of the sealing surfaces are reduced. Prior to the opening of the wedge sluice valve, the auxiliary valve devices may selectively be opened in order to reduce the pressure in the housing interior space and thereby facilitate the process of opening the wedge sluice valve. Accordingly, it is unnecessary for the valve operating rod to exert any large forces in order to move the wedge-shaped gate member.

16 Claims, 28 Drawing Figures

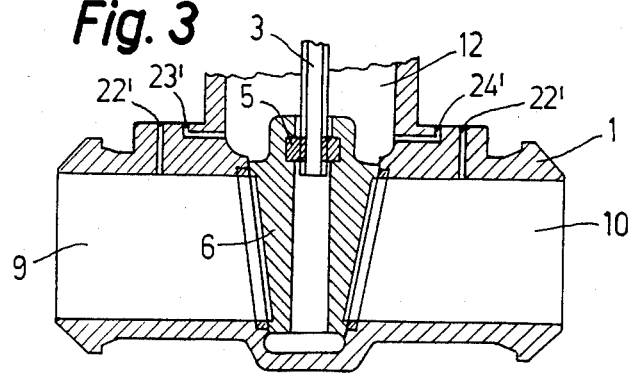
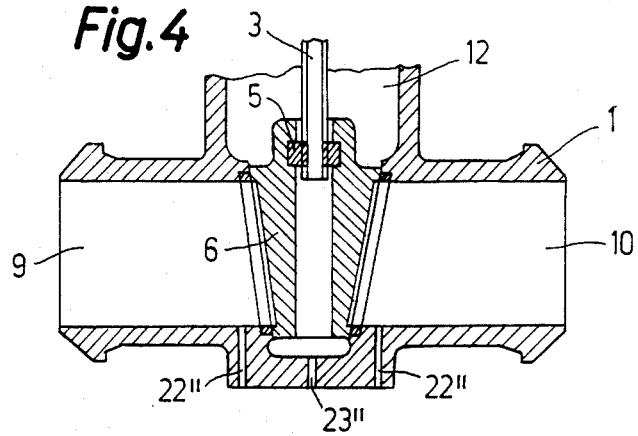
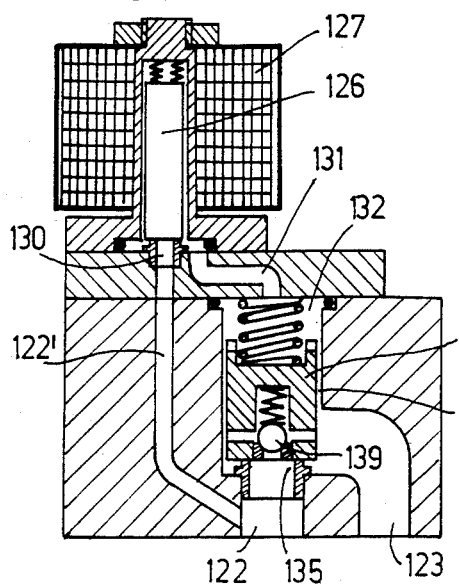
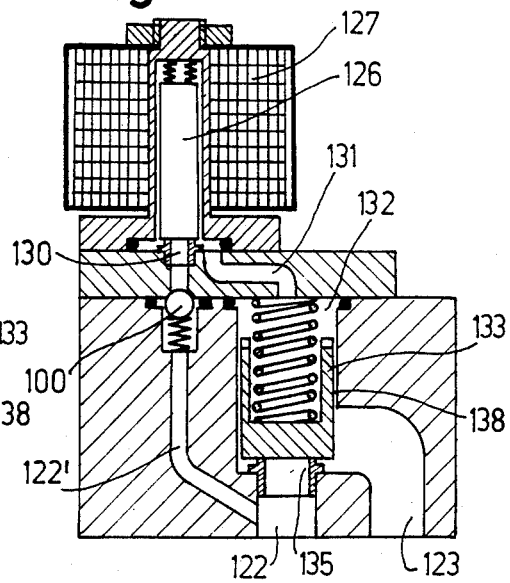

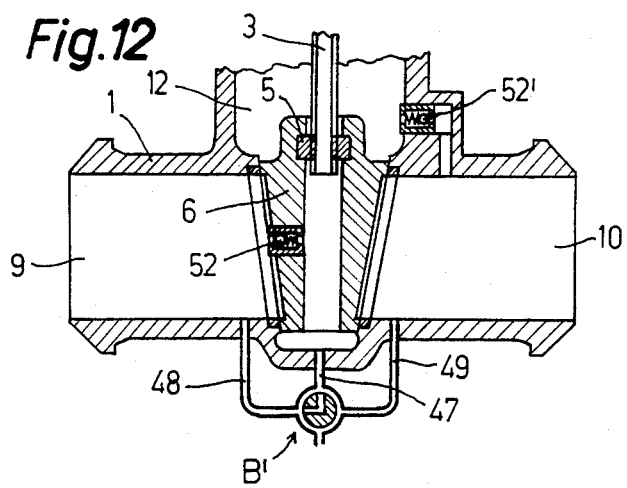
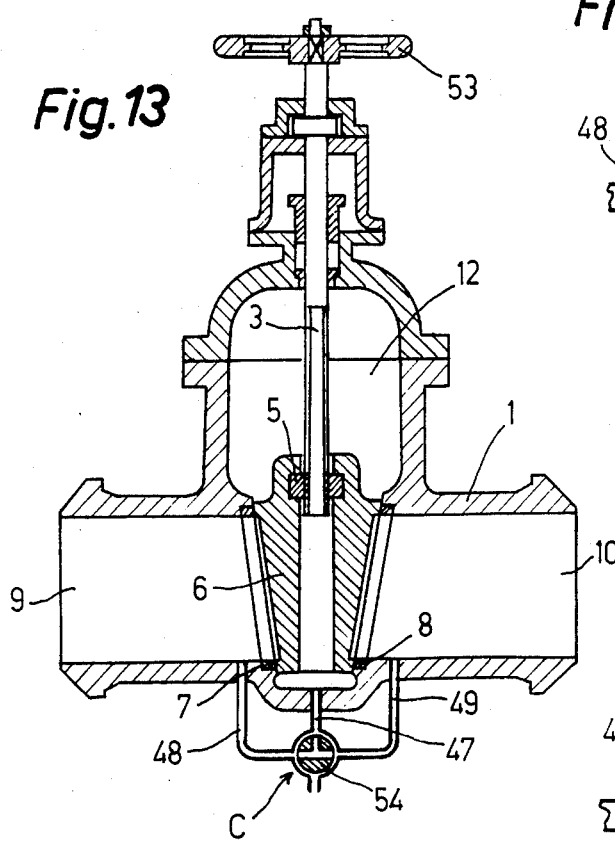
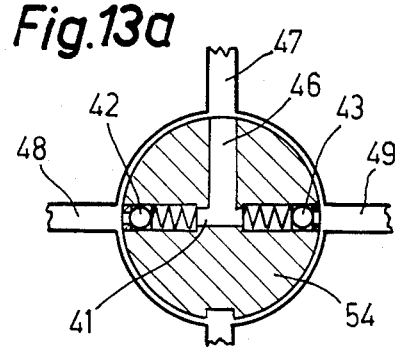
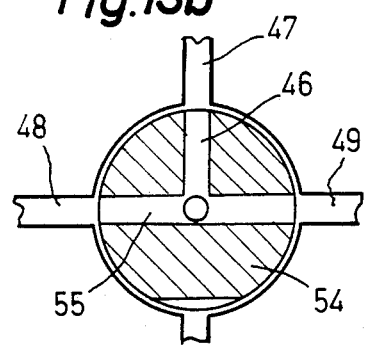

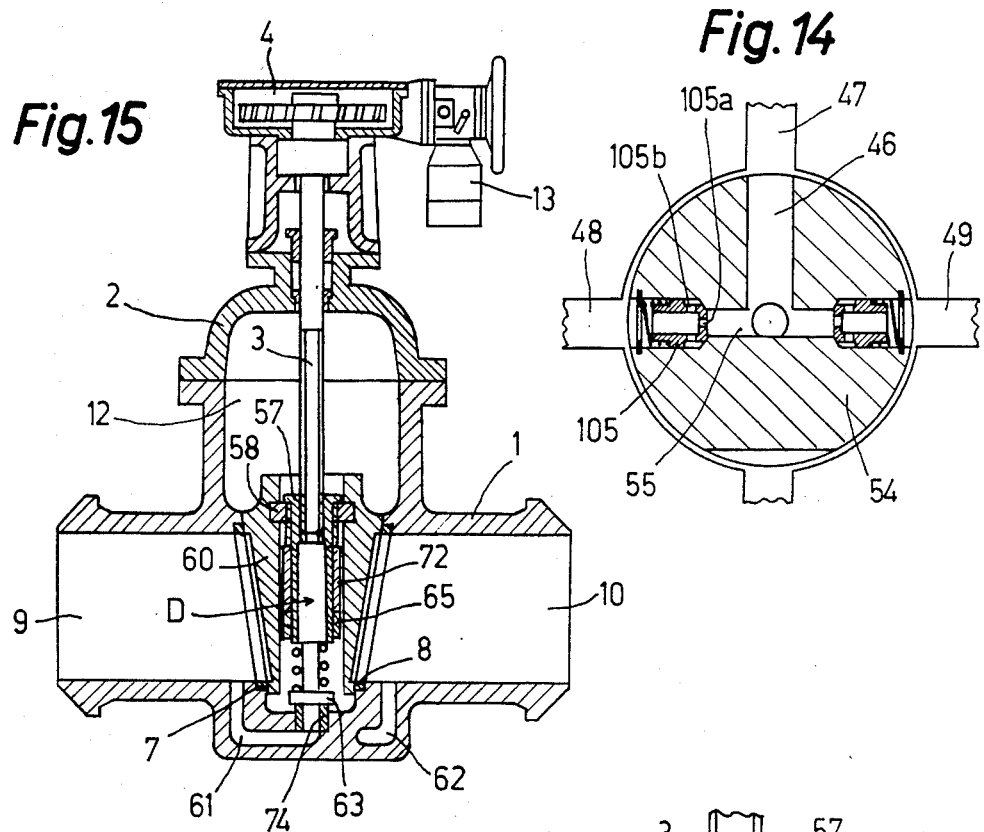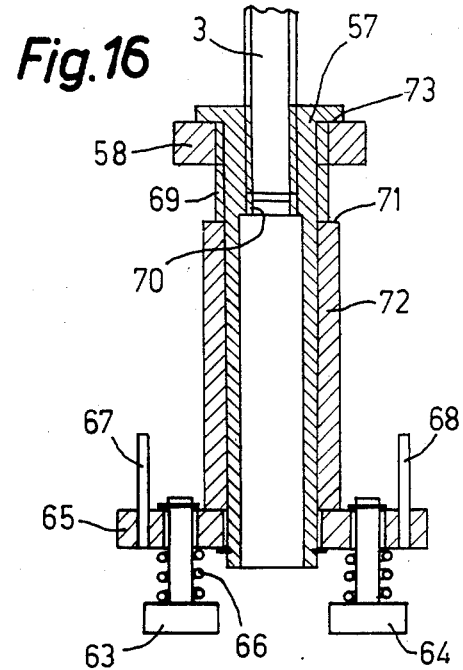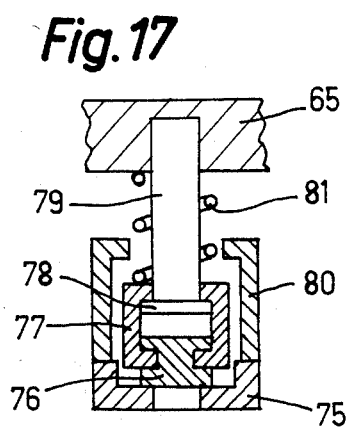

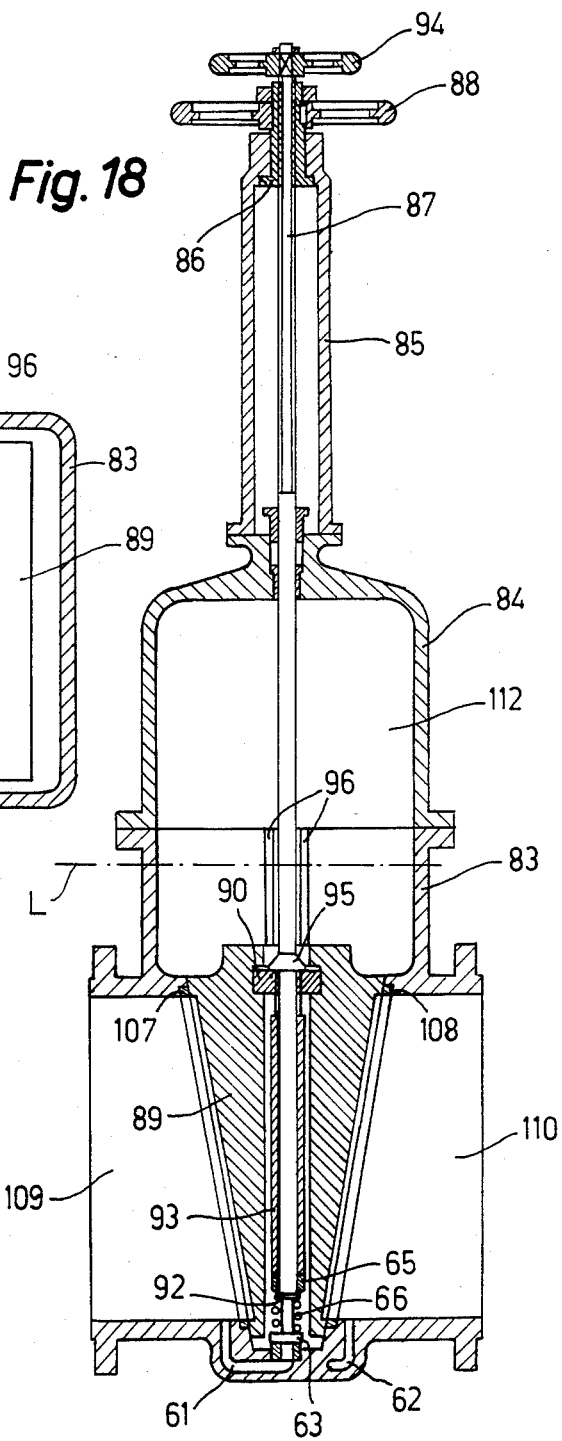

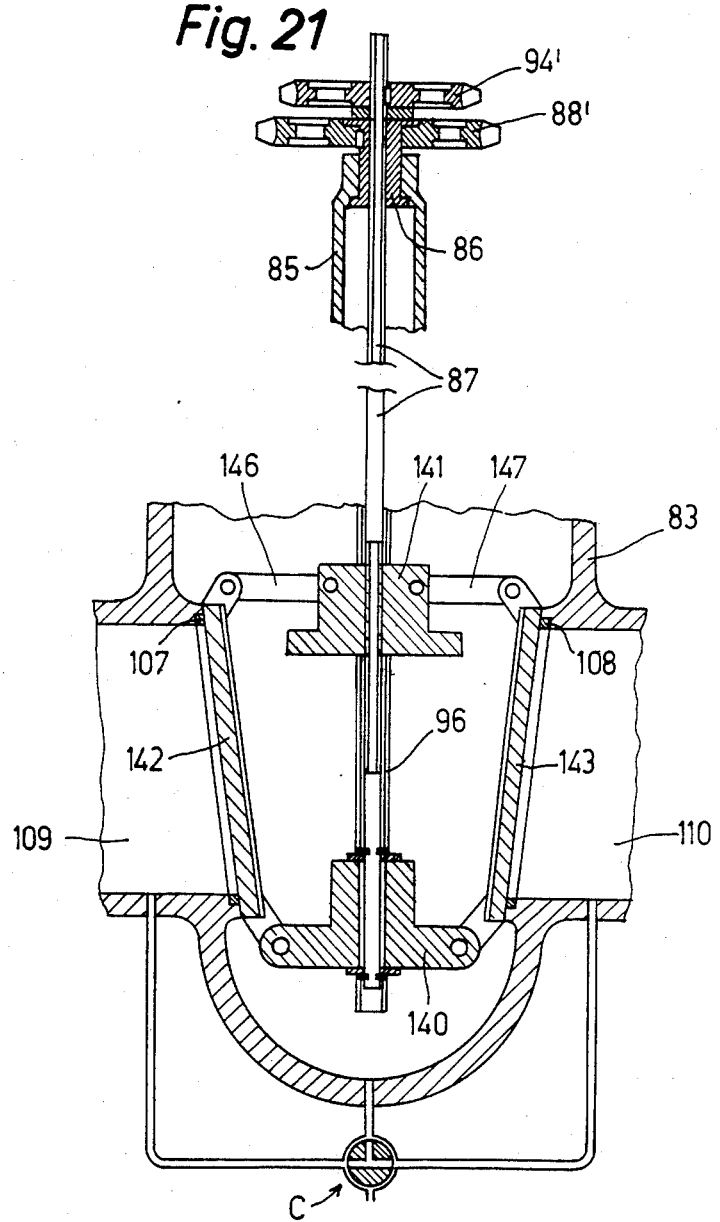

WEDGE SLUICE VALVE

BACKGROUND OF THE INVENTION

The invention relates to a wedge sluice valve with a wedge-shaped gate member which is movable by means of a valve rod and which can be pressed closed agaist the ends of two tubular conduit sections.

Wedge valves of this general type, for tubular conduits, are known. They enable the flow to pass through without undergoing a change in direction, so that when the valve is wide open there is no increased resistance to fluid flow. However, known valves of this type have the disadvantage of causing relatively high wear on the sealing surfaces of the gate member, due to sliding friction between the surfaces of the gate member and sealing surfaces during the opening and closing of said gate. Further, the known wedge-shaped gate members require high operating forces for moving and pressing shut the gate member, requiring correspondingly expensive drive systems. The wedge angle between the sealing surfaces of such known gate members is small, e.g. about 6°, in order to avoid having too high a resultant force being exerted on the gate member in the retraction direction by the action of the pressure of the fluid medium. Accordingly, when the valve is being opened the sealing surfaces on the low pressure side rub together under the force exerted by the said pressure of the medium, which leads to excessive wear and very high repair costs.

OBJECTS AND SUMMERY OF THE INVENTION

The object of the invention is thus to devise a wedge sluice valve of the type described, such that the mentioned disadvantages can be avoided; in particular, the friction between the sealing surfaces, the wear of said surfaces, and the magnitude of the required operating forces are all reduced.

The inventive wedge sluice valve by which this object is achieved has a construction such that the interior spaces of the two tubular conduit sections are connected to the interior of the housing by means of at least one auxiliary valve device which establishes the respective connections.

The auxiliary valve devices enable control of the pressure in the interior of the wedge sluice valve housing. With the gate member of the wedge valve closed, the pressure in the interior of the housing is preferably kept at the same level as that in the interior of the particular tubular conduit section which is at the higher pressure. For this purpose, the auxiliary valve devices between the said housing interior and each one of the tubular conduit section interiors may comprise a check valves for providing communication between said housing interior and the conduit section interior when the pressure in the former is lower than that in the latter. In this way, the wedge-shaped gate member is pressed against its seat by means of the high fluid pressure prevailing in the interior of the wedge valve housing. It thus becomes unnecessary for the valve rod to exert a large compressive seating force. In addition, the wedge angle between the sealing surfaces of the gate member may be larger than the wedge angles of the prior art; it may be, for example, 10° to 30° without impairing the tight closure. If the gate member is slidably guided in guide means in the housing, sliding contact of the sealing surfaces during the opening and closing of the valve can be substantially reduced by employing the larger angle. The result is reduced wear and lower required operating force. The pressure in the housing interior also facilitates the closing of the wedge valve as during the closing the pressure below the gate member is lower, by virtue of the increased flow velocity, than the pressure in the feed conduit and thus in the housing interior.

In order to be able to additionally facilitate the closing of the wedge valve the wedge angle between the sealing faces of the gate member may be made adjustable, such as by providing the sealing faces on two pivotable sealing plates. By means of an operating mechanism the sealing plates can then, prior to the closing of the wedge valve, be adjusted so that during the closing the wedge angle is smaller, or even negative, so that accordingly the fluid pressure exerts a smaller force component on the gate member in the opening direction, or even exerts a force in the closing direction. Only when the gate member has reached the closed position the sealing plates are then returned to their operative positions in engagement with the ends of the two tubular conduit sections.

The wedge valve is preferably double sealing, having a flexible gate member with pivotable plates which bear against the ends of the two tubular conduit sections under the pressure prevailing in the housing interior. It is particularly suitable for large pipelines.

When high pressure exists in the interior of the housing of the wedge valve, it is more difficult to open the valve. Therefore, advantageously the high pressure is reduced to an appropriate level before the valve is opened. In this way the wedge-shaped gate member can be moved with a very low operating force. For this purpose, the auxiliary valve devices between the housing interior and at least one of the tubular conduit interiors may comprise a valve which can be opened by a control device for bleeding pressure medium from the housing interior. The control device may be operated by electronic control means prior to the opening of the wedge valve. The control is based on the pressures in the housing interior and the tubular conduit interiors. In simpler embodiments, the control device may be manually operated.

In a preferred embodiment, the auxiliary valve devices may be in the form of a ball valve, by which the housing interior and the tubular conduit interiors can selectively be put into communication directly or through check valves built into the ball valve.

In another embodiment, poppet valves may be disposed between the housing interior and the tubular conduit interiors, said poppet valves operating as check valves and being openable by control devices.

Exemplary embodiments of the inventive wedge valve are illustrated schematically in the drawings.

BRIEF DESCRIPTION OF THE DRAWINGS

FIG. 3 and FIG. 4 schematically show two alternative possibilities for connecting auxiliary valve devices to the housing interior and the tubular conduit interiors of a wedge sluice valve;

FIGS. 5, 6 and 8 each show an auxiliary valve device for a wedge valve according to FIG. 3;

FIG. 12 illustrates possible variations of the embodiment of FIG. 11, wherein the check valves are separate from the ball valve;

FIG. 13 shows a wedge valve with auxiliary valve devices in the form of a ball valve, and in which the wedge valve is actuated by a hand wheel;

FIGS. 13a and 13b show details of the ball valve C of FIG. 13, in two positions;

FIG. 14 illustrates a modification in a view similar to that of FIG. 13b;

FIG. 15 shows a wedge valve in which auxiliary valves are built into the interior of the wedge valve;

FIG. 16 shows detail D of FIG. 15, rotated by 90°;

FIG. 17 shows a variant auxiliary valve which may be used in the wedge valve of FIGS. 15 and 16, which auxiliary valve has a built-in bleed valve;

FIG. 18 shows a wedge valve which is hand-wheel operated, with the auxiliary valves built into the interior of the housing of the wedge valve;

FIG. 19 shows a cross-sectional view on line L in FIG. 18;

FIG. 21 shows another embodiment of a wedge valve having an adjustable wedge angle.

DETAILED DESCRIPTION OF THE DRAWINGS

Figure 1:
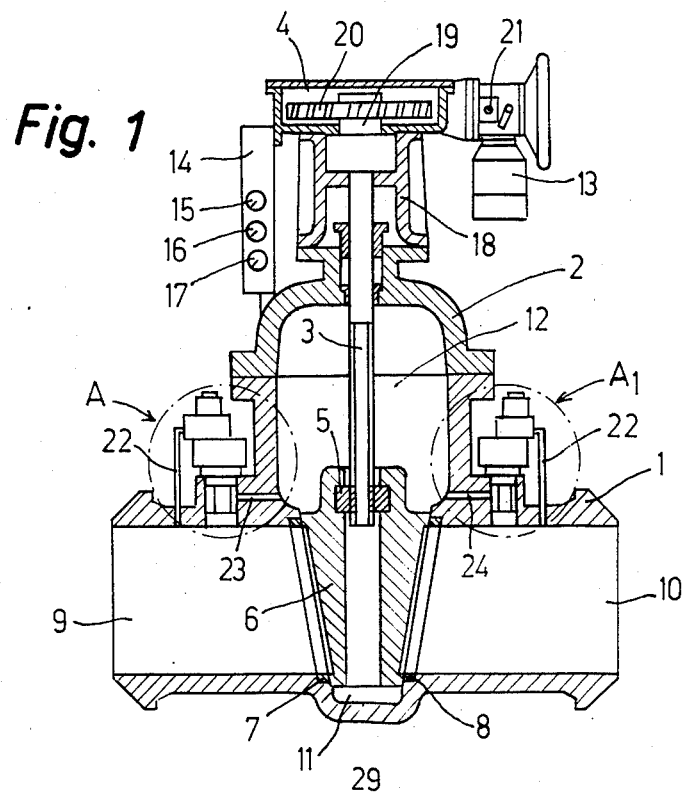
FIG. 1 shows a wedge sluice valve with electromagnetic auxiliary valves and electronic control means.
Figure 2:
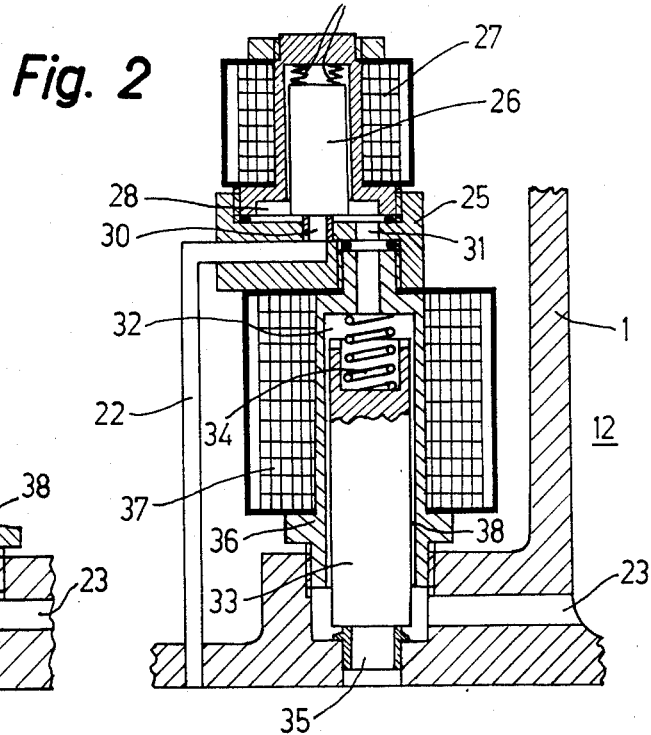
FIG. 2 is a magnified view of the electromagnetic auxiliary valve A of FIG. 1.

The wedge sluice valve according to FIGS. 1 and 2 comprises a housing 1 and a cover 2, and a threaded valve rod 3 which passes through the cover. The upper end of rod 3 extends into a reducing drive 4, and its lower end is attached to a wedge-shaped gate member 6 by means of a nut 5 anchored in the gate member. The gate member 6 is sealingly pressed against ring-shaped seats 7 and 8 on the ends of a feed pipe 9 and a withdrawal pipe 10, respectively. Integral to the bottom of the housing 1 is a widened region 11 which communicates with the interior space 12 of the housing above the wedge-shaped gate member 6.

An electric motor 13 is connected to the reduction drive 4, and a switch box 14 is mounted, as shown, which houses a suitable electronic control means and three manometers 15, 16 and 17. The manometers are in operative association with the feed pipe 9, the withdrawal pipe 10, and the housing interior space 12, respectively. The manometers measure the pressure at each of these locations and generate corresponding signals in the form of electrical pulses which are transmitted to the electronic control means.

A support 18 of a drive mechanism is screwed onto the upper part of the cover 2. The drive mechanism is comprised of a rotatable cylindrical piece 19 which connects the threaded valve rod 3 with a worm gear wheel 20 of the reduction drive 4. A potentiometer 21, built into the transmission between the worm gear wheel 20 and the electric motor 13, signals the position of the wedge-shaped gate member 6.

On both sides of the housing interior space 12 on the housing 1 are disposed electromagnetic or solenoid valves A and $A_1$, respectively. These valves are connected by tubes 22 to the feed pipe 9 and the withdrawal pipe 10, respectively. The valves A and $A_1$ can pass fluid from the pipes 9 and 10 into the housing interior space 12 via channels 23 and 24, respectively, which are formed in the housing 1.

Figure 2A:
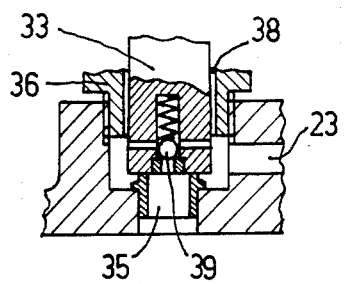
FIG. 2a shows a variation of a detail of FIG. 2.

The valves A and $A_1$ are identical in construction and only one is shown in FIGS. 2 and 2A. Each of the valves A and $A_1$ is comprised of a supporting part 25 in the upper region of which a piston-like valve body in the form of an armature 26 is disposed, with a coil 27. The armature is interior to a chamber 28, and the upper end of the armature presses against helical springs 29. The lower end of the armature 26 closes off an opening 30 in the supporting part 25, into which opening the tube 22 opens. A channel 31 is also formed in the supporting part 25, and connects the chamber 28 with a chamber 32 above the upper side of a second piston-like valve body in the form of an armature 33. The upper end of the armature 33 presses against a spring 34 and the lower end of the armature 33 closes off an opening 35. The armature 33 is movable in a cylinder 36 which serves as the core of a coil 37.

The cylinder 36 is screwed into an opening in the housing 1 to mount the valves A and $A_1$ on the housing. A gap 38 between the armature 33 and the cylinder 36 forms a restricted passage for the fluid to pass therethrough.

The valve rod 3 is rotated with the aid of the electric motor 13 and the reduction drive 4. This rotational movement is controlled by the electronic control in the switch box 14.

The hydraulic assistance system is controlled by means of the two solenoid valves A and $A_1$, such that one of the valves is opened while the other remains closed.

When a control switch for opening the wedge valve is tripped, the electronic control obtains a reading of the pressure differences between the housing interior space 12 and the pipes 9 and 10; this is done by means of the manometers 15, 16, and 17. Then one of the auxiliary valves A or $A_1$ is opened and the pressure in the housing interior space 12 falls, with release of said pressure into the pipe in which the pressure is lower. Next, the electric motor 13 is started. It rotates the threaded rod 3, by means of the reduction drive 4, until the wedge-shaped gate piece 6 is retracted into its fully open position, causing the potentiometer 21 in the reduction drive 4 to signal that the open position has been reached.

The control valves A and $A_1$ first establish a connection of the housing interior space 12 to the pipes 9 and 10 via the tubes 22 and the channels 23 and 24, respectively. When the wedge valve is closed, the control valves function as check valves, so that the pressure is the same in the housing interior space 12 as in the higher pressure pipe. This presses the wedge-shaped gate member 6 against the seats 7 and 8. If the electromagnetic valves A and $A_1$ are closed, the springs 29 and 34 press the armatures 26 and 33, respectively, against their respective seats. The increasing pressure in the tube 22 acts on the end face of the armature 26 until the force of the springs 29 is overcome. The armature 26 is then raised from its seat, and the fluid flows through the opening 30 and into the chamber 28 and the channel 31.

Thereby the armature 33 is pressed against its seat, and the opening 35 remains blocked. The fluid flows on into the channel 23 or 24 via the gap 38 between the armature 33 and the cylinder 36.

Thus a constant communication between the high pressure feed pipe 9 and the housing interior space 12 is established. The fluid flows through the tube 22, the channel 31, the gap 38, and the channel 23, with the armature 26 acting as a check valve. This situation persists as long as the coil winding 27 is not energized. On the other hand, the fluid will be prevented from flowing in the reverse direction, from the channel 23 to the tube 22. Armature 33 is pressed against its seat in opening 35 by the force of the helical spring 34 and also by the pressure of the medium in chamber 32.

When the coils 27 are energized the magnetic valves A and $A_1$ are opened. The armature 26 then moves upwardly, unblocking the opening 30. The fluid flows from chamber 32 through chamber 28 and into tube 22 at a higher rate than through the gap 38 which gap acts as a flow restriction. Accordingly, the pressure in the chamber 32 disposed above the armature 33 is reduced. Thereafter, in addition the coil 37 is excited, and the armature 33 can also move upward, thus unblocking the opening 35, whereby the fluid can escape from the housing interior space 12 into pipe 9, via channel 23 and opening 35.

Under certain conditions the second magnet coil 37 may be dispensed with. The armature 33 is then moved upward merely by the pressure of the fluid from channel 23 acting on the underside of said armature, when the pressure in chamber 32 has been sufficiently lowered as a result of the unblocking of opening 30. In this manner it is, however, not possible to open the solenoid valve A which communicates with feed pipe, because the pressure in the feed pipe and therefore in chamber 32 of this valve A is always at least equal to the pressure in the housing interior 12. If it is desirable to open both solenoid valves A and $A_1$, in order to prevent an excessive decrease of the pressure in the housing interior space 12, advantageously the second magnet coil 37 is also employed.

The electromagnetic valves A and $A_1$ cannot be closed so as to prevent passage of the fluid through them into the housing interior space 12, because they always function as check valves. When the wedge valve is closed, the fluid may flow from pipe 9 or 10 into the housing interior space 12 through the gap 38 since the small armature 26 always functions as a check valve.

Gap 38 is relatively narrow, and as a rule the fluid therefore flows too slowly into the housing interior space 12, so that an auxiliary check valve 39 has to be provided in the lower end of the armature 33, as shown in FIG. 2a, to connect the opening 35 directly to the channel 23.

With smaller wedge valves the large armature 33 may under certain conditions be dispensed with altogether, the small armature 26 alone then forming the auxiliary valve device.

After the pressure in the housing interior space 12 has been reduced by opening electromagnetic control valve $A_1$ (or A where appropriate), the wedge valve can be opened with much less force than required with wedge valves of the prior art.

In the wedge valve according to FIGS. 1 and 2, the threaded rod 3 is driven by electric motor 13 via reduction drive 4, and the solenoid valves A and $A_1$ are operated prior to the opening of the wedge valve, said operation being via the automatic control action of the electronic controllers disposed in the switch box 14, and being based on the measured pressures in the pipe interiors 9 and 10 and the housing interior space 12. Of course, simpler embodiments are possible. For example, a hand wheel may be provided to rotate the threaded valve rod 3. The solenoid valves A and $A_1$ may be actuated and deactuated by manual switches. Under a manual arrangement, the operator might simply open both A and $A_1$ before opening the wedge valve, so as to establish a pressure in the housing interior space 12 which pressure is intermediate that in the feed pipe 9 and that in the withdrawal pipe 10. If it is known which one of the two pipes 9, 10 is the withdrawal pipe (or if the second magnet coil 37 has been omitted), it is also possible to open only the solenoid valve A or $A_1$ which communicates with the withdrawal pipe. Fluid will then escape from the housing interior space 12 through the opened solenoid valve, while in the other solenoid valve fluid from the feed pipe will flow into the housing interior space 12 through the check valve 39. The pressure resulting in the housing interior space 12 will then depend on the cross-sectional area of the check valve 39.

FIGS. 5 to 10 show various auxiliary valve devices which can be used in a wedge valve, in place of the solenoid valves A and $A_1$ of FIG. 1, for connecting the housing interior space 12 to the two pipe interior spaces 9 and 10. The auxiliary valve devices of FIGS. 5 to 10 each include, like the solenoid valves A, $A_1$, an opening between the housing interior space and the respective pipe interior space, said opening being closed off by a valve body whose upper side communicates with the housing interior space 12 via a restricted (or valve controlled) passage similar to the gap 38 in FIG. 2. In addition, the space above the upper side of the valve body is connected to the pipe interior space via a controlled valve similar to the solenoid valve 26 in FIG. 2. The auxiliary valve devices of FIGS. 5 to 10 are used in connection with wedge valves according to FIG. 3 or FIG. 4.

Figure 7:
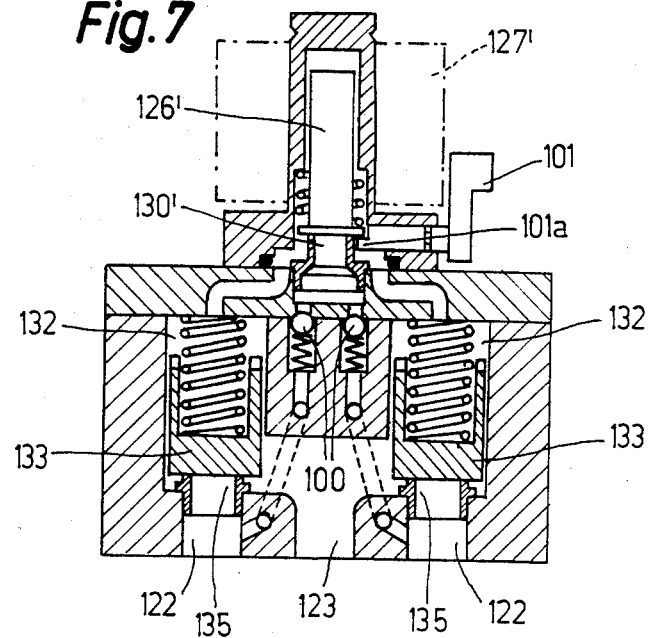
FIGS. 7, 9 and 10 each show an auxiliary valve device for a wedge valve having connections as shown in FIG. 4.
Figure 8:
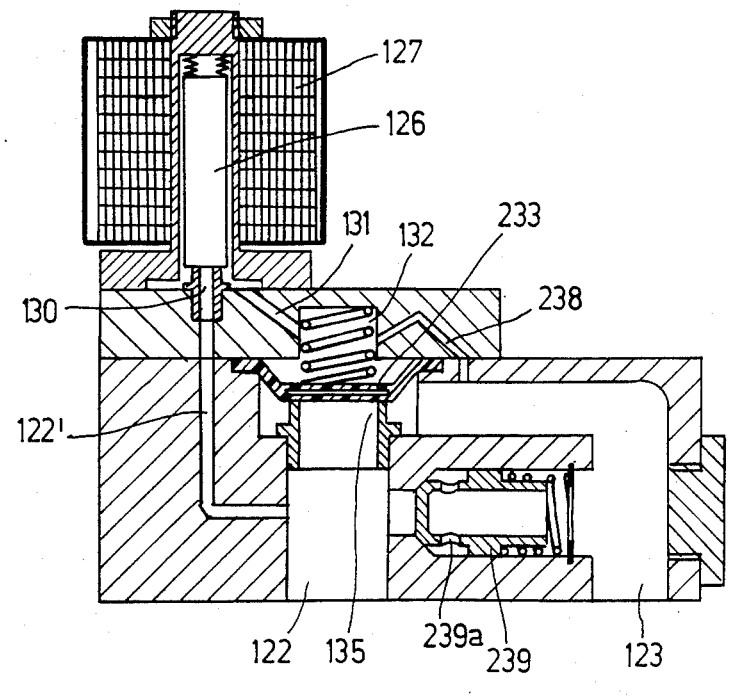
Figure 9:
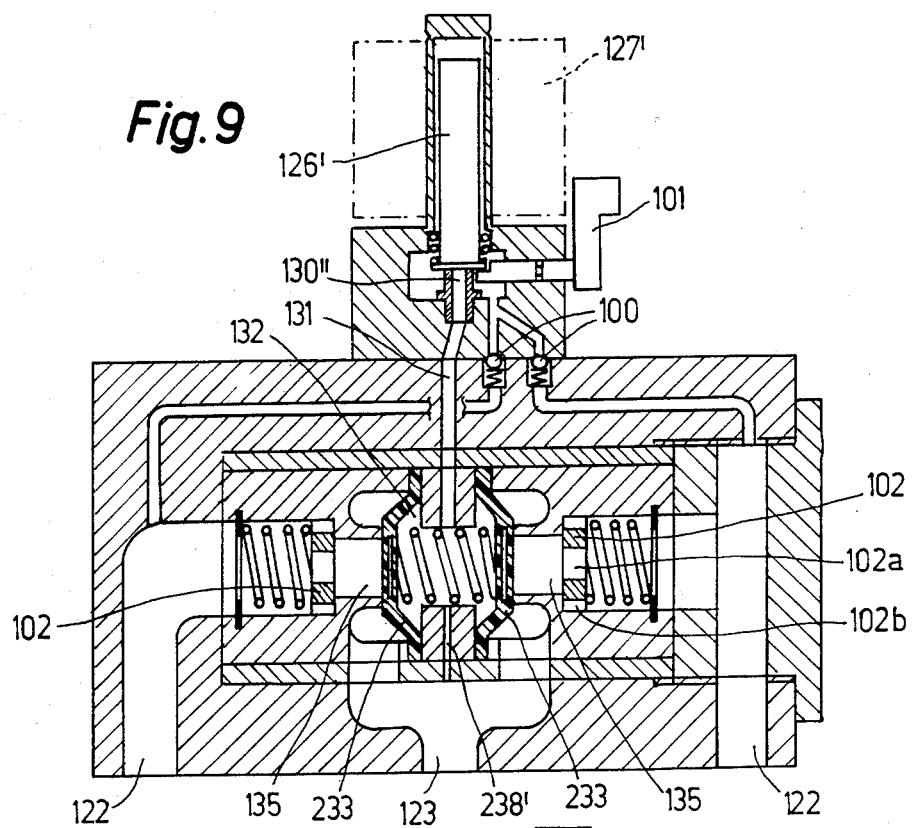
Figure 10:
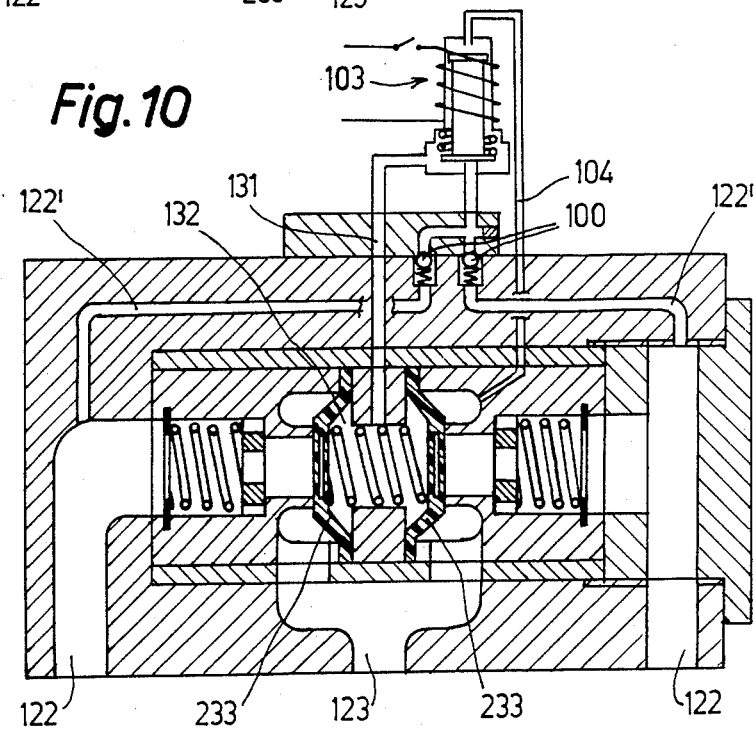

The wedge valves of FIGS. 3 and 4 are substantially similar to the wedge valve shown in FIG. 1, having a housing 1, a the threaded valve rod 3, a nut 5, a wedge-shaped gate member 6, pipe interior spaces 9, 10 and a housing interior space 12. In the wedge valve according to FIG. 3, auxiliary valve devices according to FIG. 5 or 6 or 8 are mounted to the housing 1 on both sides of the housing interior space 12, and then communicate with the pipe interior spaces 9 and 10, respectively, via channels 22', and with the housing interior space 12 via channels 23' and 24', respectively. In the wedge valve according to FIG. 4 a common combined or double auxiliary valve device according to FIG. 7 or 9 or 10 is connected to the underside of the housing 1 and communicates with the pipe interior spaces 9, 10 via channels 22", and with the housing interior space 12 via a channel 23".

The auxiliary valve devices shown in FIGS. 5 and 6 each include a connection 122 for the channel 22' leading to the pipe interior space 9 or 10, and a connection 123 for the channel 23' leading to the housing interior space 12 of the wedge valve. The connection 122 communicates with a valve seat 135 which is closed off by a spring-loaded valve piston 133. The valve piston 133 is guided in a bore. The space 132 above the valve piston 133 communicates, via the gap 138 between the valve piston 133 and its bore, with the connection 123 to the housing interior space 12 of the wedge valve, said gap 138 acting as a flow restriction. The space 132 also communicates, via a channel 131, an opening 130 and a channel 122', with the connection 122 to the pipe interior 9 or 10, respectively. The opening 130 is closed off by a spring-loaded piston-like valve body in the form of an armature 126 with which cooperates a magnet coil 127. In FIG. 5, in addition, a check valve 139 is provided in the lower end of the valve piston 133, similar to the check valve 39 in FIG. 2a, while in FIG. 6 a check valve 100 is provided in the channel 122'.

The operation of the device shown in FIG. 5 is described as follows. If, with the wedge valve closed, the pressure in the pipe interior space 9 (feed pipe) and therefore in the connection 122 is higher than the pressure in the housing interior space 12 and in the connection 123, the armature 126, acting as a check valve, will be raised from its seat 130. The feed pressure reaches the space 132 above the valve piston 133 which will therefore remain closed. Via the gap 138 the feed pipe pressure also reaches the connection 123 and then the housing interior space 12. The check valve 139 in the lower end of the valve piston 133 will also open, permitting fluid from the pipe interior space 9 to quickly flow into the housing interior space 12 until the feed pipe pressure is established therein. Prior to the opening of the wedge valve the magnet coil 127 is energized at least in the auxiliary valve device which provides communication between the housing interior space 12 and the withdrawal pipe 10 where the pressure is lower than in the housing interior space 12. The armature 126 thereby unblocks the opening 130, the pressure in the space 132 above the valve piston 133 falls, and the valve piston will be raised from its seat 135 by the housing pressure acting on a portion of the underside of the valve piston 133. Fluid from the housing interior space 12 can therefore now escape into the withdrawal pipe. An electronic control device controlling the pressure in the housing interior space 12 can be used for opening only the auxiliary valve device which connects the housing interior space 12 with the withdrawal pipe 10. The pressure in the housing interior space 12 will then fall because the flow-in of fluid from the feed pipe 9 is restricted by the check valve 139. Otherwise both auxiliary valve devices can be opened simultaneously.

The operation of the auxiliary valve device shown in FIG. 6 is similar to that of the device shown in FIG. 5 except that, when the wedge valve is closed, the check valve 100 in channel 122' will prevent the pressure in the space 132 above the valve piston 133 from rising to the feed pipe pressure. By reason of the gap 138 the pressure in the space 132 will remain the same as the pressure in the housing interior space and in the connection 123. The valve piston 133 can therefore be raised from its seat 135 by the feed pipe pressure in connection 122 if the housing pressure in connection 123 and thus the pressure in space 132 is lower than the feed pipe pressure. The valve piston 133 itself thus acts as a check valve for increasing the housing pressure to the feed pipe pressure. Prior to the opening of the wedge valve both auxiliary valve devices are opened simultaneously in order to reduce the pressure in the housing interior space 12. No electronic control device is necessary; instead, a check valve acting as a flow restriction in the reverse direction can be provided in the connection 122 for controlling the pressure, as described hereinafter with reference to FIG. 9.

The double auxiliary valve device illustrated in FIG. 7 includes two valve pistons 133 with valve seats 135 for providing communication between the housing interior space 12 of the wedge valve and the two pipe interior spaces 9, 10 via connections 122 for the channels 22" (FIG. 4) and a common connection 123 for the channel 23" (FIG. 4). The two connections 122 communicate with the spaces 132 above the upper sides of the valve pistons 133 via two check valves 100 and a common preload valve which comprises a valve seat 130' and a valve piston 126'.

When the whedge valve is closed the operation is the same as in FIG. 6: If in the connection 122 communicating with the feed pipe 9 the pressure is higher than in the housing interior space 12 and in the connection 123, the respective valve piston 133 will act as a check valve so that the pressure in the housing interior space 12 will rise to the feed pipe pressure. Check valves acting as flow restrictions in the reverse direction are preferably provided in the connections 122.

Prior to the opening of the wedge valve the valve piston 126' is raised from its seat 130'. For this purpose a manually operable lever 101 is provided having a shaft which carries an eccentric 101a at its end. Instead—or in addition—a magnet coil 127' could be provided as shown in broken lines. The unblocked opening 130' permits escape of fluid from the spaces 132 through one of the connections 122 and to the withdrawal pipe 10, whereas, by virtue of the check valves 100, no fluid can flow into these spaces 132 from the feed pipe 9. The pressure in the spaces 132 above the valve pistons 133 therefore falls approximately to the withdrawal pipe pressure so that the valve pistons 133 will be raised from their seats 135 by the pressures acting on their undersides. A pressure at a level between the feed pipe pressure and the withdrawal pipe pressure is thereby established in the connection 123 and thus in the housing interior space 12. The pressure level will depend on the check valves acting as flow restrictions in the reverse direction if these are provided in the connections 122.

The auxiliary valve device shown in FIG. 8 is generally similar to that of FIG. 5, but a spring-loaded valve diaphragm 233 has been substituted for the valve piston 133 of FIG. 5, a flow restricting by-pass bore 238 has been substituted for the gap 138, and a separate check valve 239 has been substituted for the check valve 139 provided in the valve piston 133.

The check valve 239 includes openings 239a having a selected predetermined cross-sectional area. If, prior to the opening of the wedge valve, the magnet coil 127 of the auxiliary valve device is energized which provides communication between the housing interior space 12 and the withdrawal pipe 10, so that in this auxiliary valve device the valve diaphragm 233 is raised from its seat 135 by the housing pressure and fluid from the housing interior space 12 escapes to the withdrawal pipe 10, then the cross-sectional area of the openings 239a of the check valve 239 in the other one of the auxiliary valve devices determines the magnitude of the flow of fluid from the feed pipe 9 through this other auxiliary valve device and into the housing interior space 12, and thus also the level of the pressure that will be established in the housing interior space 12.

If desired it would be possible, of course, to include a check valve, similar to the check valve 100 in FIG. 6, in the channel 122' of the device of FIG. 8. The check valve 239 could then be dispensed with because the valve diaphragm 233 would itself act as a check valve between the connections 122 and 123, but a check valve acting as a flow restriction in the reverse direction should in this case preferably be provided in the connection 122, as described hereinafter with reference to FIG. 9.

If check valves are provided in the channels 122' it is again possible to combine two auxiliary valve devices according to FIG. 8 in a double auxiliary valve device having a common connection 123 for the channel 23" (FIG. 4) and also a commmon preload valve with a valve seat 130" and a valve piston 126'. Such a double auxiliary valve device is shown in FIG. 9. It comprises two valve diaphragms 233 with valve seats 135 for providing communication between the housing interior space 12 and the two pipe interior spaces 9, 10 via connections 122 for the channels 22" (FIG. 4), and the common connection 123. The two connections 122 communicate with the space 132 above the upper sides of the valve diaphragms 233 via two check valves 100 and the common preload valve 130", 126'. If the pressure in the connection 122 communicating with the feed pipe 9 is higher than the pressure in the housing inner space 12 and in the connection 123, the respective valve diaphragm 233 will act as a check valve since, by virtue of the check valves 100—and also by virtue of the closed preload valve 130", 126' in the illustrated embodiment—, the pressure in the space 132 above the diaphragms 233 cannot rise above the housing pressure in connection 123, with which the space 132 communicates via a restricted diaphragm by-pass bore 238'. The pressure in the housing interior space 12 will therefore rise until it reaches the feed pipe pressure. Prior to the opening of the wedge valve the preload valve piston 126' is raised from its valve seat 130" (manually by means of lever 101, or else by means of magnet coil 127'). Fluid will then escape from the space 132 through the unblocked opening 130" and through one of the check valves 100 into the withdrawal pipe 10. The valve diaphragms 233 will therefore be raised from their seats 135 by the pressures acting on the undersides of the valve diaphragms. A pressure at a level between that of the feed pipe pressure and that of the withdrawal pipe pressure will result in connection 123 and thus in the housing interior space 12.

The magnitude of this pressure resulting in the connection 123 and in the housing interior space 12 is determined by check valves 102 acting as flow restrictions in the reverse direction which are provided between the valve seats 135 and the connections 122. These valves 102 in the illustrated embodiment comprise discs which are spring-biassed against valve seats and which include restricted passages 102a within the valve seat diameter, and additionnal passages 102b outside of the valve seat diameter. If the discs 102 are in engagement with their valve seats the cross-sectional area of the restricted passages 102a alone is effective so that the flow resistance is relatively high. If, however, fluid flows from the valve seat 135 of the valve diaphragm 233 towards the connection 122, this fluid will raise the disc 102 from its seat so that fluid can also flow through the outer passages 102b, whereby with this flow direction the flow resistance is correspondingly reduced. The ratio of the two flow resistances will determine the magnitude of the pressure resulting in the connection 123 when both valve diaphragms 233 are raised from theiir seats 135.

Similar check valves acting as flow restrictions in the reverse direction could also be provided in the other auxiliary valve devices which have been described, in each case in the flow paths between these devices and the pipe interior spaces 9, 10 of the wedge valve, e.g. in the connections 122.

In the auxiliary valve device according to FIG. 9 the space 132 above the upper sides of the valve diaphragms 233 communicates with the interior of the seat 130" of the preload valve. After the closing of the wedge valve the pressure thereby created in the housing interior space 12 and thus also in the space 132 and in the valve seat 130" will oppose the closing force of the valve piston 126', and attenuate shocks which might occur if the valve piston 126' closes rapidly.

The auxiliary valve device illustrated in FIG. 10 is generally similar to the device of FIG. 9 with the following exceptions: An electromagnetically operated three-way valve 103 is substituted for the preload valve 126', 130" of FIG. 9, and a conduit 104 is substituted for the restricted diaphragm by-pass bore 238' of FIG. 9, the conduit 104 providing communication between the connection 123 and the three-way valve 103. The three-way valve 103 selectively provides communication between the channel 131 from the space 132 above the upper sides of the valve diaphragms 233 and either the conduit 104 or the channels 122' which lead to the connections 122. In the illustrated rest position of the three-way valve 103 the conduit 104 communicates with the channel 131, the pressure in the space 132 above the valve diaphragms 233 is therefore the same as that in connection 123 so that, with the wedge valve closed, the valve diaphragms 233 will act as check valves—as described with reference to FIG. 9. Prior to the opening of the wedge valve the three-way valve 103 is operated, whereby the channels 122' communicate with channel 131 so that fluid from the space 132 can escape through the channel 131, the three-way valve 103 and one of the channels 122' to the withdrawal pipe 10. The pressure in the space 132 will therefore fall to the withdrawal pipe pressure so that the valve diaphragms 233 will open.

FIGS. 11, 11a, 11b and 11c again show a wedge sluice valve for pipe lines of medium and large diameters. In this wedge sluice valve the auxiliary valve devices comprise a ball valve B instead of the piston or diaphragm valves of the previously described embodiments. The ball valve B performs the same functions as the previously described piston or diaphragm valves. The drive mechanism of the wedge valve is identical to that of FIGS. 1 and 2, and includes an electric motor 13 and electronic control means disposed in the switch box 14. Being identical to those elements in FIGS. 1 and 2, these elements are not shown in FIG. 11.

The ball valve B comprises a spherical body 40 with a horizontal channel 41 closed off on both ends by ball check valves 42 and 43 with respective springs 44 and 45. A channel 46, opening out into a tube 47, extends vertically upward from the center of the body 40. Tube 47 leads to the chamber 11 disposed below the wedge-shaped gate member 6. Lateral tubes 48 and 49 connect the ball valve with the feed pipe 9 and the withdrawal pipe 10, respectively.

Another channel 50 also leads into the center of the spherical body 40, and runs horizontally, perpendicular to channels 41 and 46.

Figure 11:
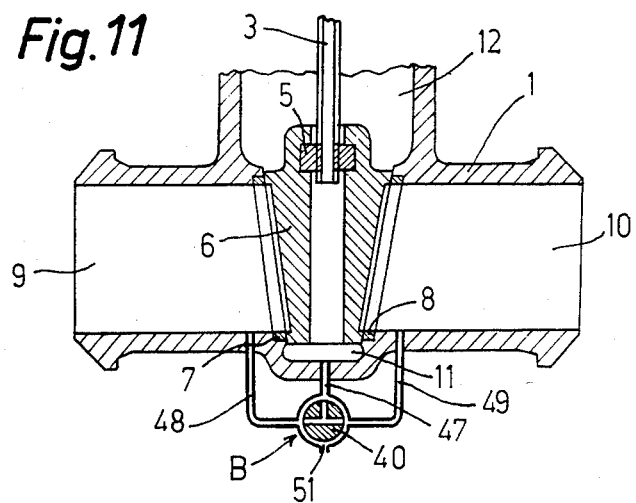
FIG. 11 represents a wedge valve with electronic control and with auxiliary valve devices in the form of a ball valve containing two check valves.
Figure 11A:
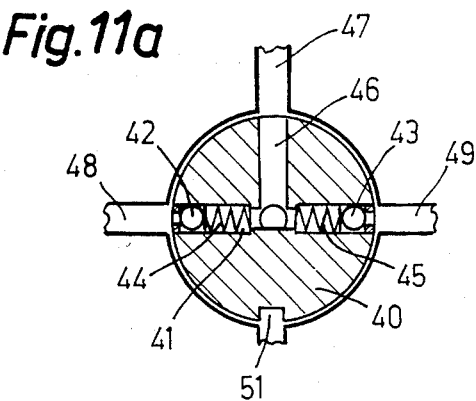
FIGS. 11a, 11b, and 11c show details of the ball valve B of FIG. 11, in its three operating positions.

When the wedge valve is closed, the ball valve B is positioned as shown in FIG. 11a, and the pressure in the housing interior space 12 becomes equal to the maximum pressure prevailing in either pipe 9 or pipe 10. This pressure equilibration is achieved via the tubes 47, 48, and 49 and the channel 41. As part of this equilibration process, the check valve 42 (or 43) in channel 41 of body 40 is opened, since the pressure of the fluid overcomes the closing force of spring 44 (or 45). Chamber 11 is in communication with the housing interior space 12.

The system of FIG. 11 operates as follows: After a main switch is tripped, the electronic controller determines which pipe, 99 or 10, is under higher interior pressure. Then body 40 of ball valve B is set, by electric, pneumatic, or hydraulic control means connected at slot 51, but not shown, such that the pressure in the housing interior space 12 is released into pipe 9 or 10 via tube 47 and channels 46 and 50. Further, electric motor 13 is turned on, causing the threaded valve rod 3 to rotate via the reduction drive 4. The rotation of the rod causes movement of the wedge-shaped gate member, via nut 5. The built-in potentiometer or other sensing element signals when the end position is reached.

Figure 11B:
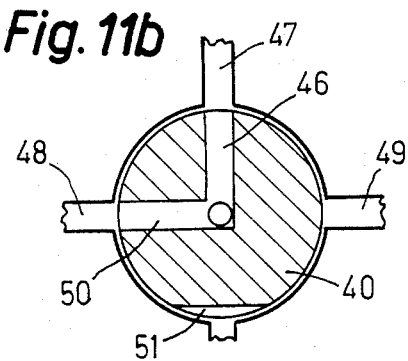
Figure 11C:
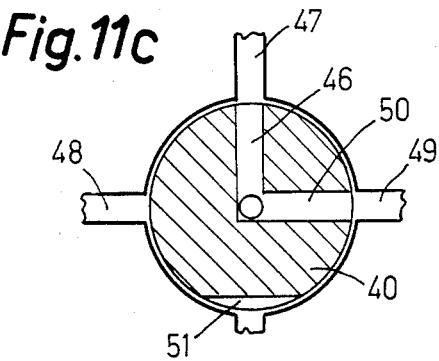

Body 40 can be rotated into 3 positions via its engagement slot 51: left position as shown in FIG. 11b, right position as shown in FIG. 11c, and a rest position as shown in FIG. 11a. In the rest position tube 47 is connected to tubes 48 and 49 via check valves 42 and 43.

The force required to change the position of spherical body 40 is relatively small, and wear is limited to this body, which is small and is inexpensive to manufacture.

The wedge angle of the gate member is larger than in prior art wedge valves, whereby wear on the sealing surfaces is reduced. The fluid pressure is utilized to supplement the forcing of the wedge-shaped gate member against its seats. The force required to operate the gate member is therefore relatively small.

FIG. 12 illustrates a variant of FIG. 11 wherein the check valves connecting the feed pipe 9 and the withdrawal pipe 10 to the housing interior space 12 are not built into the ball valve B'. As shown in the left zone of FIG. 12, a check valve 52 may be installed between the pipe interior space 9 and the housing interior space 12; e.g., valve 52 may be built into the wedge-shaped gate member 6. Alternatively, a check valve 52' such as illustrated in the right zone of FIG. 12 may be installed in a wall of housing 1 so as to connect the pipe interior space 10 and the housing interior space 12. In this instance the ball valve B', lacking the check valves, includes only the channels 46 and 50 according to FIG. 11b and 11c.

FIGS. 13, 13a and 13b illustrate a wedge valve with a hand wheel 53 and with a ball valve C which can be rotated into two positions: position I (FIG. 13a) when the wedge valve is closed, and position II (FIG. 13b) which enables the wedge valve to be opened. In position I of the ball body 54 the housing interior space 12 is connected to the pipes 9 and 10 via the tubes 47 and 48 (or 47 and 49, respectively), the check valves 42 or 43, respectively, and the channels 41 and 46. A pressure is developed in housing interior space 12, and this pressure serves to press the wedge-shaped gate member 6 against the seats 7 and 8.

When it is desired to open the wedge valve, the spherical body 54 must be positioned in position II. In this position the fluid can flow freely between the interior spaces 9, 10, and 12, via the tubes 47, 48, and 49 and channels 55 and 46 in the spherical body 54. The pressure in the housing interior space 12 is reduced, and with this pressure reduction the force pressing the wedge-shaped gate member 6 against the seats is also reduced. In this way the opening of the wedge valve is facilitated. Rotational movement is transmitted from the hand wheel 53 to the threaded valve rod 3, and the threaded nut 5 raises the gate member 6 from the seals 7 and 8. Upward movement of the gate member 6 is guided by guide means in the housing 1.

Position II of the ball valve C affords substantial advantages over the classical bypass passage, in that the housing interior space 12 is connected to the interior spaces 9 and 10. The situation of position I with the check valves 42 and 43 and tubes 47, 48, and 49 is not attainable at all when a simple bypass passage is employed.

The ball valve C with only two positions might also be used in the wedge valve according to FIG. 11. In such a case the electronic controllers may be dispensed with. The operating procedure would be first to turn the spherical valve body of the ball valve to position II, and then to turn on the electric motor 13 for opening the wedge valve.

In position II of the ball valve C, as explained above, both pipe interior spaces 9 and 10 communicate with the housing interior space 12. The pressure resulting in the housing interior space 12 will therefore correspond approximately to the average of the feed pipe pressure and withdrawal pipe pressure. If a lower pressure in the housing interior space 12 is defined for the opening of the wedge valve, check valves 105 acting as flow restrictions in the reverse direction can be provided in channel 55 of spherical body 54 as shown in FIG. 14, the operation of these check valves 105 being similar to that of the discs 102 described above the reference to FIG. 9. The valves 105 comprise sleeves which are spring-loaded so that an end wall thereof, provided with a restricted passage 105a, is urged into contact with a valve seat. If the end wall is raised from the valve seat by the flow of fluid against the spring bias, the fluid also flows through additional passages 105b in the peripheral wall of the sleeve. The cross-sectional area of the restricted passage 105a determines the pressure drop across that one of valves 105 which is seated, whereas the pressure drop across the other valve 105, which is raised from its seat by the flowing fluid, is determined by the sum of the cross-sectional areas of passages 105a and 105b.

It may be advantageous to turn the spherical body 54 to an intermediate position (not shown) when the wedge valve is open, in which intermediate position neither channel 41 nor channel 55 is aligned with tubes 48 and 49. In this intermediate position the valves 42, 43 and 105, respectively, in channels 41 and 55 are out of circuit and are thus protected when the wedge valve is open.

The wedge valve illustrated in FIGS. 15 and 16 is also comprised of a housing 1 and a cover 2 penetrated by a threaded valve rod 3, which rod is rotated with the aid of the electric motor 13 and the reduction drive 4.

The lower end of rod 3 is secured into a threaded bushing 57 which fits into a collar 58 which is attached interiorly in a wedge-shaped gate member 60.

When the wedge valve is closed, the housing interior space 12 communicates with the pipes 9 and 10 via channels 61 and 62 and auxiliary valves 63 and 64, which valves are in the form of check valves having springs 66. Both auxiliary valves are held on a support member 65 which is rotatably attached to the threaded bushing 57. The support member 65 is guided by two guide rods 67 and 68 which can slide vertically in two openings in the lower part of the gate member 60, which itself is guided in vertical sliding movement in housing 1 of the wedge valve. When electric motor 13 is turned on, valve rod 3 is rotated, via reduction drive 4. The movement of rod 3 is transmitted to threaded bushing 57, which has a right-hand external thread 69 and a left-hand internal thread 70 (or vice versa), both with the same pitch. Initially the threaded bushing 57 rotates at half the rotational speed of threaded valve rod 3, at the same time moving upwardly and carrying with it the support member 65 with the two auxiliary valves 63 and 64, while the collar 58 remains stationary. The fluid pressure in the housing interior space 12 can be released. When the upper end 71 of a spacing sleeve 72 reaches the collar 58, the threaded bushing 57 is prevented from moving further upward with respect to the wedge-shaped gate member 60. Accordingly, the bushing 57 ceases to rotate, but now begins to lift the gate member 60 upward via the collar 58, whereby the wedge valve opens.

Because the auxiliary valves 63 and 64 are opened before the wedge valve, the force required to open the wedge valve is reduced.

In the closing procedure for the wedge valve, the gate member is first lowered down to the seats 7 and 8. Then the threaded bushing 57 again rotates (at half rotational speed) with the threaded rod 3, until a stop 73 engages the collar 58. Then the two auxiliary valves 63 and 64 are lowered the rest of the way down to their seats 74 in the end openings of the respective channels 61 and 62.

The advantage of this embodiment is that the auxiliary valves are built into the housing, and additional seals are not required. The entire system is controlled very simply by the threaded rod 3, which can be driven by the motor 13 or alternatively by a hand wheel.

The pressure in the housing interior space 12, pressing the valves 63 and 64 against their seats 74, may be very high. Substantial force is required to open the auxiliary valve for which valve the pressure in the associated channel 61 or 62 is minimal. In order to reduce the force required, valves according to FIG. 17 may be employed instead of valves 63 and 64. In such valves, the valve head 75 has a smaller, release valve 76 built into it. A sleeve 77 is attached to the valve 76, which sleeve extends around and engages a flange 78 on an actuating shaft 79 fixed to the support member 65. Another sleeve 80, affixed to the valve head 75, in turn extends around and encloses the sleeve 77. A spring 81 disposed between the support member 65 and the sleeve 77 presses the valve head 75 against its associated seat, via sleeve 77 and the release valve 76. To open the auxiliary, and eventually the wedge valve, the support member 65, as described supra with reference to FIGS. 15 and 16, is pulled upward. The flange 78 on actuating shaft 79 is thereby caused, first, to carry with it only the release valve 76 (via sleeve 77), whereby release valve 76 is lifted up from valve head 75, and pressure can equalize between the front and back of valve head 75. Only after a specific excursion of sleeve 77 is valve head 75 then carried along with sleeve 77 when it engages the inturned top edge of sleeve 80.

The wedge valve according to FIG. 18 comprises a housing 83 with a cover 84, a support structure 85, a threaded bushing 86, and a threaded rod 87 which is screwed into the threaded bushing 86. The threaded rod can be moved axially by rotating the threaded bushing 86 with a hand wheel 88. A wedge-shaped gate member 89 is disposed on the lower end of rod 87, connected to the rod 87 by a nut 90. Auxiliary valves 63 and 64 are built into gate member 89, which valves are identical to those of FIGS. 15 and 16 and, similar to the latter valves, are supported on support member 65. Also similarly to FIGS. 15 and 16, the support member 65 is guided by two guide rods 67 and 68 (not illustrated in FIG. 18) which move in two bore holes in the lower part of the wedge-shaped gate member 89. The support member 65 with the two auxiliary valves 63 and 64 and their springs 66 is mounted on the threaded rod 87 by a retaining nut or ring 92 and a spacing bushing 93.

To open the wedge valve, first the threaded rod 87 is rotated by means of hand wheel 94. This causes the rod 87 to rotate in the threads of threaded bushing 86 and nut 90, both of which thread systems have the same pitch, whereby rod 87 moves axially upward. This upward movement is continued until the upper end of spacing bushing 93 reaches nut 90. Also, the auxiliary valves 63 and 64 are lifted from their seats in the end openings of channels 61 and 62. In this way, by means of channels 61 and 62, the interior spaces 109, 110, and 112 are connected. During all these steps the wedge-shaped gate member 89 remains pressed against seats 107 and 108. It is only lifted from those seats when hand wheel 88 is rotated, which wheel is rigidly connected to the threaded bushing 86. This opens the wedge valve.

To close the wedge valve, first the hand wheel 88 is rotated, until the wedge-shaped gate member 89 is in a position pressed against the seats 107 and 108. Then hand wheel 94 is rotated, until a stop 95 on threaded rod 87 has been lowered to the nut 90; this places the auxiliary valves 63 and 64 against their seats in channels 61 and 62, thereby completing the closing of the wedge valve.

In this closed position, auxiliary valves 63 and 64 function as check valves, by virtue of the springs 66. The difference between the pressure in the housing interior space 112 and the maximum pressure in the two interior spaces 109 and 110 is equalized out.

The vertical movement of gate member 89 is a sliding movement guided by vertical guides 96 which are provided in the housing 83 on two sides of the gate member 89 and which are engaged by vertical ridges 89' (FIG. 19) integrally formed on the gate member 89. Similar guide means for the wedge-shaped gate member are provided for all the other previously described wedge valves of the invention Obviously, the wedge valve of FIG. 18 may be operated by an electric motor, reduction drive, and coupling instead of manually by the hand wheels 88 and 94.

Figure 20:
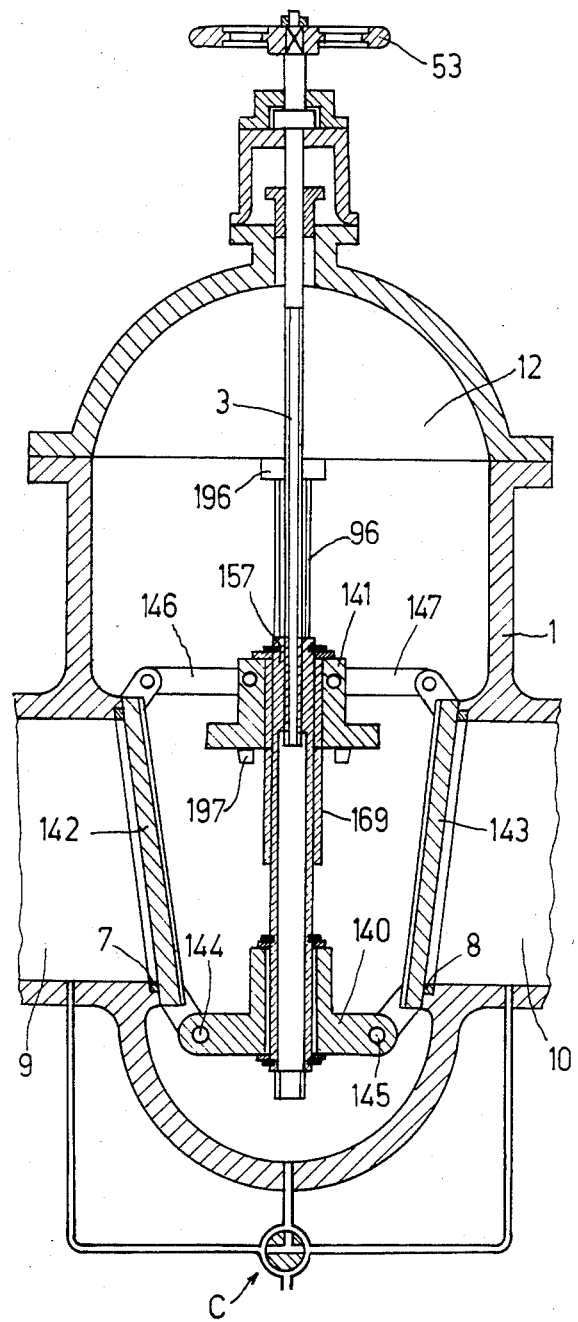
FIG. 20 shows a wedge valve in which the wedge angle of the wedge-shaped gate member is adjustable.
Figure 20A:
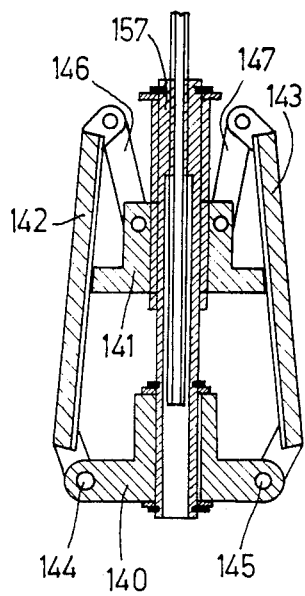
FIG. 20a shows the gate member of FIG. 20 in a condition in which the wedge angle has been changed for closing the wedge valve.

FIGS. 20 and 20a illustrate a wedge valve similar to that shown in FIG. 13, having a hausing 1, valve rod 3, hand wheel 53, ring-shaped seats 7 and 8, pipe interior spaces 9 and 10, housing interior space 12 and ball valve C. The operation of the ball valve C is the same as in FIG. 13. The gate member includes a lower slide block 140 and an upper slide block 141, both being vertically slidably guided by means of guides 96 provided in the housing 1. Two sealing plates 142 and 143 are each pivotably connected to the lower slide block 140, at 144 and 145, respectively, and are each connected to the upper slide block 141 by links 146 and 147, respectively. The lower end of threaded valve rod 3 is screwed into an inner thread of a bushing 157 whose lower end is mounted in the lower slide block 140 so as to be rotatable, but not axially displaceable therein. The threaded bushing 157 also has an outer thread 169 which is screwed into an inner thread in the upper slide block 141. The outer thread 169 of bushing 157 is a right-hand thread, and its inner thread is a left-hand thread (or vice versa), both threads having the same pitch.

For opening the wedge valve, starting from the position illustrated in FIG. 20, the valve rod 3 is rotated (after the operation of ball valve C). Rod 3 screws into bushing 157 and pulls the latter upward, together with the two slide blocks 140 and 141 mounted on it, so that the sealing plates 142 and 143 are lifted away from their seats 7 and 8, respectively. When the upper slide block 141 abuts against stops 196 which are provided at the upper ends of guides 96, it cannot move upward any further. With continued rotation of rod 3 the threaded bushing 157 will therefore also start to rotate within the inner thread of the upper slide block 141 (at half the rotational speed of rod 3). The bushing 157 and thus the lower slide block 140 will therefore continue to move upward, so that links 146 and 147 will pull the upper portions of sealing plates 142 and 143 inward until they abut against the upper slide block 141—as shown in FIG. 20a. The wedge angle between the sealing plates 142 and 143 is now negative so that, when the wedge valve is subsequently closed again, the fluid pressure from the feed pipe 9 or 10 will exert a force component in the closing direction on the respective sealing plate 142 or 143 and thus on the gate member.

For closing the wedge valve, rod 3 is rotated in the opposite direction. Rod 3 screws out of threaded bushing 157 and pushes the latter downward, together with the two slide blocks 140 and 141 mounted on it, until the upper slide block 141 abuts against stops 197 provided in the housing 1. From this moment on the upper slide block 141 cannot ove further downward. The threaded bushing 157 therefore has to rotate with the rod 3 (at half rotational speed), and in so rotating moves downward in the upper slide block 141, via the outer thread 169, until the position of FIG. 20 is reached again, with the sealing plates 142 and 143 in engagement with their seats 7 and 8, respectively.

The gate member of the wedge valve illustrated in FIG. 21 is similar to the gate member of FIGS. 20 and 20a, and includes a lower slide block 140 and an upper slide block 141 which are vertically slidably guided by means of guides 96 provided in housing 83. The gate member also includes two sealing plates 142 and 143 which are pivotably connected to the lower slide block 140, and are connected to the upper slide block 141 via links 146 and 147, respectively. The lower end of a valve rod 87 is received in the lower slide block 140 so as to be rotatable, but not axially displaceable therein. The valve rod 87 is similar to that shown in FIG. 18, being screwed into a threaded bushing 86 mounted in a support 85. The support 85 is connected with the housing 83 as in FIG. 18. The rod 87 can be moved axially by rotating the bushing 86 with a hand wheel or a gear wheel 88'.

The upper slide block 141 is screwed over an external thread on the valve rod 87. By rotating the gear wheel 88' the two slide blocks 140 and 141 can thus be raised and lowered in unison.

The valve rod 87 can also be rotated about its axis by means of a second hand wheel or gear wheel 94' which is keyed to the rod 87. Rotation of the rod 87 will cause axial adjustment of the upper slide block 141 relative to the lower slide block 140 so that, by virtue of links 146 and 147, the wedge angle between the sealing plates 142 and 143 will be reduced, and can even be made negative (as in FIG. 20a).

To prevent the valve rod 87 from being moved axially when it is rotated, by screwing into the bushing 86, the bushing 86 can be made freely rotatable when the rod 87 is rotated, for example by releasing a clutch (not shown) in the drive to the gear wheel 88'. In this manner the bushing 86 will rotate with the rod 87 so that the latter will not be screwed into the bushing.

In this wedge valve, therefore, the raising and lowering of the gate member and the adjustment of the wedge angle between the sealing plates 142 and 143 can be effected independently. The wedge angle can be adjusted in every position of the gate member by rotating the gear wheel 94'. This may be advantageous when the wedge valve is used partially opened, as a throttle. In such an operating state the wedge angle can be so adjusted that the axial stress in the valve rod 87 is at a minimum. The wedge angle could even be regulated automatically for minimum stress in rod 87, by sensing the axial force transmitted from rod 87 to bushing 86 and controlling the drive of the gear wheel 94' in response to the magnitude of this force.

I claim:

1. A wedge sluice valve apparatus comprising a housing having two tubular conduit sections in axial alignment with inner and outer ends and a chamber communicating with the inner ends of the conduit sections through an opening at the inner ends; a wedge shaped gate member movable between an upper position within said chamber and a lower position to close fluid flow communication within said tubular conduit sections, said gate member having a wedge angle of 10° to 30° and being slidably guided in guide means in the housing; valve seats on the inner ends of said conduit sections against which the gate member is pressed in the lower position; and auxiliary valve means for providing selective fluid communication between the interior spaces of said fluid conduit sections and said chamber when said gate member is in said lower position, said auxiliary valve means includes check valves and at least one valve body for controlling flow to the chamber interior space from the interior space of the tubular conduit sections only when the pressure in the chamber interior space is lower than that in the interior space of the respective tubular conduit section, and said auxiliary valve means also including closure means which can be opened for releasing pressurized fluid from the chamber interior space to an automatically controlled degree, wherein said at least one valve body is a valve diaphragm and wherein flow regulating communication is provided by a restricted bore between said chamber interior space and a space above the at least one valve body.

2. A wedge sluice valve according to claim 1; wherein the check valves cooperate with a valve seat for providing fluid communication between each of said conduit section interior spaces and said chamber interior space, said space above said valve body communicating with said chamber interior space via said flow regulating communication, and communicating with the respective conduit section interior space via said closure means.

3. A wedge sluice valve according to claim 2; wherein said closure means is a manually operable valve.

4. A wedge sluice valve according to claim 2; wherein said closure means is an electromagnetically operable valve.

5. A wedge sluice valve according to claim 1; wherein the communications between said chamber interior space and said conduit section interior spaces provided by said auxiliary valve means each include a check valve acting as a flow restriction in a reverse direction.

6. A wedge sluice valve apparatus comprising a housing having two tubular conduit sections in axial alignment with inner and outer ends and a chamber communicating with the inner ends of the conduit sections through an opening at the inner ends; a wedge shaped gate member movable between an upper position within said chamber and a lower position to close fluid flow communication between said tubular conduit sections, said gate member having a wedge angle of 10° to 30° and being slidably guided in guide means in the housing; valve seats on the inner ends of said conduit sections against which the gate member is pressed in the power position; and auxiliary valve means for providing selective fluid communication between the interior spaces of said fluid conduit sections and said chamber when said gate member is in said lower position, said auxiliary valve means including:
   check valves for controlling fluid flow to the chamber interior space from the interior space of the tubular conduit sections when the pressure in the chamber interior space is lower than that in the interior space of the respective tubular conduit section,
   means for opening said check valves for conducting flow therethrough from both the chamber interior space and the interior space of the conduit on the upstream side of the gate valve to the interior space of the conduit on the downstream side of the gate valve, and
   additional check valves disposed in series with the check valves conducting fluid flow in a forward direction from the chamber interior space to the interior space of each tubular conduit section through a first predetermined cross-sectional area, and conducting fluid flow in a reverse direction from the interior space of each tubular conduit section to the chamber interior space through a restricted second predetermined cross-sectional area smaller than said first predetermined cross-sectional area.

7. A wedge sluice valve according to claim 6; wherein the controlling check valve coprise valve bodies, each cooperating with a valve seat for providing fluid communication between each of said conduit section interior spaces and said chamber interior space, a space above said valve body communicating with said chamber interior space via a flow restricting communication, and communicating with the respective conduit section interior space via said means for opening.

8. A wedge sluice valve according to claim 7; wherein said valve bodies have upper sides communicating with one another and communicating with two additional check valves via said means for opening which is common to both of said check valves.

9. A wedge sluice valve according to claim 7; wherein said means for opening is a manually controllable shut off valve.

10. A wedge sluice valve according to claim 7; wherein said means for opening is an electromagnetically operable shut-off valve.

11. A wedge sluice valve apparatus comprising a housing having two tubular conduit sections in axial alignment with inner and outer ends and a chamber communicating with the inner ends of the conduit sections through an opening at the inner ends; a wedge shaped gate member movable between an upper position within said chamber and a lower position to close fluid flow communication between said tubular conduit sections, said gate member having a wedge angle of 10° to 30° and being slidably guided in guide means in the housing; valve seats on the inner ends of said conduit sections against which the gate member is pressed in the lower position; an auxiliary valve means for providing selected fluid communication between the interior spaces of said fluid conduit sections and said chamber when said gate member in said lower position, said auxiliary valve means including check valves for controlling fluid flow to the chamber interior space from the interior space of the tubular conduit sections when the pressure in the chamber space is lower than that in the interior space of the respective tubular conduit section, means associated with said check valves for presenting a first predetermined flow resistance to said fluid flow to the chamber interior space and a second lower flow resistance for fluid traveling in the opposite direction, said auxiliary valve means also including means for opening said check valves for conducting flow therethrough from both the chamber interior space and the interior space of the conduit on the upstream side of the gate valve to the interior space of the conduit on the downstream side of the gate valve.

12. A wedge sluice valve according to claim 11;
   means for opening is disposed in series with the check valves and controls fluid flow from the chamber interior space to the interior spaces of the tubular conduit sections through a first cross-sectional area which forms said second predetermined flow resistance, and controlling fluid flow from the interior spaces of the tubular conduit sections to the chamber interior space through a restricted second cross-sectional area which forms said first predetermined flow resistance.

13. A wedge sluice valve according to claim 11; wherein the check valves comprise valve bodies, each cooperating with a valve seat for providing fluid communication between each of said conduit section interior spaces and said chamber interior space, a space above said valve body communicating with said chamber interior space via a flow restricting communication, and communicating with the respective conduit section interior space via said means for opening.

14. A wedge sluice valve according to claim 13; wherein said valve bodies have upper sides communicating with one another and communicating with two additional check valves via said means for opening which is common to both of said check valves.

15. A wedge sluice valve according to claim 13; wherein said means for opening is a manually operable valve.

16. A wedge sluice valve according to claim 13; wherein said means for opening is an electromagnetically operable valve.

* * * * *